United States Patent [19]
Kreischer et al.

[11] Patent Number: 6,045,661
[45] Date of Patent: Apr. 4, 2000

[54] PROCESS AND APPARATUS FOR RECOVERING DILUENT, MONOMER, AND COMONOMER FROM A POLYMERIZATION REACTOR EFFLUENT

[75] Inventors: Bruce E. Kreischer, Bartlesville, Okla.; Donald W. Verser; James E. Hein, both of Houston, Tex.

[73] Assignee: Phillips Petroleum Company, Bartlesville, Okla.

[21] Appl. No.: 09/082,398

[22] Filed: May 20, 1998

[51] Int. Cl.[7] .................................. B01D 3/06; B01D 3/14
[52] U.S. Cl. .............................. 203/73; 202/154; 203/80; 203/88; 526/348; 528/501; 585/802; 585/809
[58] Field of Search .................................. 203/75, 77, 74, 203/82, 87, 88, DIG. 19, DIG. 9, 99, 80, 73, 27, 26, DIG. 8; 159/DIG. 18, 2.1, 24.1; 526/348, 922, 352, 348.5; 202/172, 154; 528/501; 422/131; 585/802, 809

[56] References Cited

U.S. PATENT DOCUMENTS

| | | | |
|---|---|---|---|
| 3,152,872 | 10/1964 | Scoggin et al. | 34/15 |
| 3,803,025 | 4/1974 | Dailey | 208/107 |
| 4,218,575 | 8/1980 | Webb, Jr. | 585/715 |
| 4,286,110 | 8/1981 | Chapman | 585/719 |
| 4,589,957 | 5/1986 | Sherk et al. | 205/75 |
| 4,737,280 | 4/1988 | Hanson | 210/181 |
| 5,575,979 | 11/1996 | Hanson | 422/132 |

OTHER PUBLICATIONS

Perry, Chemical Engineers Handbook, "Distillation Controls and Optimization", pp. 6–23.
Liptak, B. G., Control Systems Engineers Handbook, pp. 874 and 875.

*Primary Examiner*—Virginia Manoharan
*Attorney, Agent, or Firm*—Ryan N. Cross

[57] ABSTRACT

A process and apparatus are provided for recovering diluent, unreacted monomer, and unreacted comonomer from a polymerization reactor effluent. The comonomer has a boiling point higher than the boiling point of the monomer and the diluent has a boiling point between the boiling points of the monomer and comonomer. The process and apparatus employ at least one flash tank, a first fractionation stage including a first column and operating at a first fractionation pressure, and a second fraction stage including a second column and operating at a higher second fractionation pressure. Comonomer is withdrawn from the first column as a fractionation product, and overhead vapor containing diluent and monomer is substantially condensed to yield a substantially condensed overhead stream. Liquid and vapor from the stream are separated in an accumulator. Vapor and liquid from the accumulator are compressed and pumped, respectively, for delivery to the second fractionation stage at approximately the second fractionation pressure. The pumped liquid is a major portion by weight of the total flow of pumped liquid and compressed vapor to the second fractionation stage. Diluent and monomer are withdrawn from the second column as fractionation products.

22 Claims, 1 Drawing Sheet

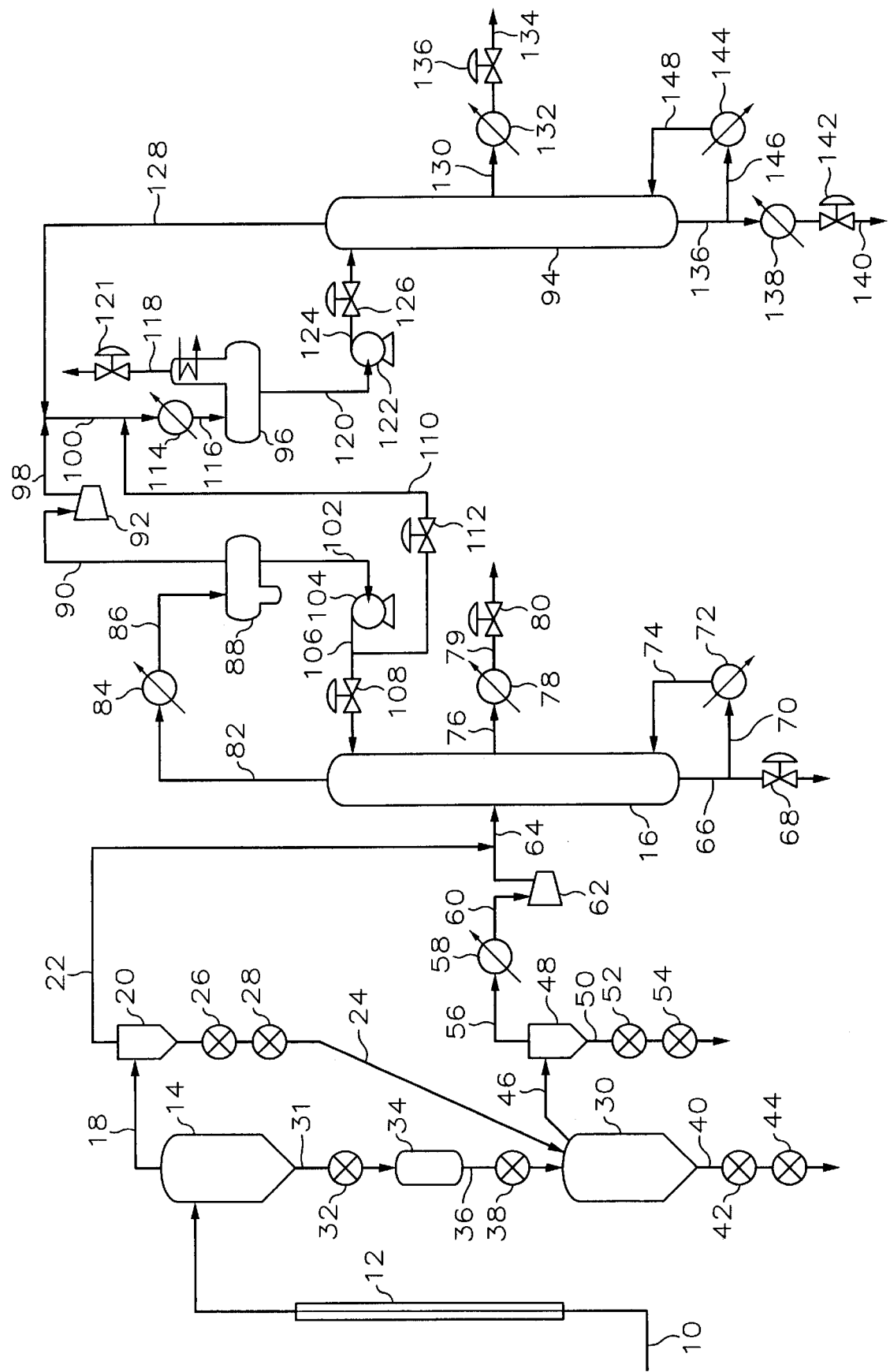

1

PROCESS AND APPARATUS FOR RECOVERING DILUENT, MONOMER, AND COMONOMER FROM A POLYMERIZATION REACTOR EFFLUENT

BACKGROUND OF THE INVENTION

The invention relates to the recovery of diluent, unreacted monomer, and unreacted comonomer from the polymerization reactor effluent as produced by a polymerization reactor in which monomer and comonomer are reacted in the diluent.

The polymer effluent comprises a slurry of polymer solids in a liquid. Liquid is typically flashed to a vapor and subjected to fractionation to recover diluent, monomer, and comonomer for recycle to the polymerization reactor. Continuing concerns in such recovery are power requirements and cost.

SUMMARY OF THE INVENTION

It is, therefore, an object of the invention to provide a process and apparatus for recovery of diluent, monomer, and comonomer from a polymerization reactor effluent which minimizes power requirements and cost.

The above object is realized by a process for recovering diluent, unreacted monomer, and unreacted comonomer from a polymerization reactor effluent comprising a slurry of polymer solids in a liquid as produced by the polymerization reaction of the monomer and comonomer in the diluent, wherein the comonomer has a boiling point higher than the boiling point of the monomer and the diluent has a boiling point between the boiling points of the monomer and comonomer, the process comprising: passing the effluent to a flash means for flashing liquid in the effluent to a vapor; providing a first fractionation stage including a first fractionation column and operating at a first fractionation pressure; passing vapor from the flash means to the first fractionation stage; withdrawing comonomer from the first column as a fractionation product; passing overhead vapor containing diluent and monomer from the first column to a cooler which substantially condenses the overhead vapor to thereby yield a substantially condensed overhead stream; passing the substantially condensed overhead stream to an accumulator in which liquid and vapor from such stream are allowed to separate; providing a second fractionation stage including a second fractionation column and operating at a second fractionation pressure higher than the first fractionation pressure; passing vapor from the accumulator to a compressor to compress such vapor for delivery to the second fractionation stage at approximately the second fractionation pressure; passing liquid from the accumulator to a pump so as to increase the pressure of such liquid for delivery to the second fractionation stage at approximately the second fractionation pressure, wherein the liquid as pumped to the second fractionation stage is a major portion by weight of the total flow of pumped liquid and compressed vapor to the second fractionation stage; and withdrawing diluent and monomer from the second fractionation column as fractionation products.

By condensing and pumping mostly liquid (preferably about 75–95% by weight) to the second fractionation stage, this minimizes the power requirement because pumping liquid to a higher pressure requires less power than compression of vapor. Moreover, because of the relatively small flow of vapor through the above-mentioned compressor, the compressor employed can be a single stage centrifugal compressor which is less expensive (as a capital expenditure and operationally) and more reliable than the more conventional reciprocating compressor.

According to another aspect of the invention, there is provided an apparatus for recovering diluent, unreacted monomer, and unreacted comonomer from a polymerization reactor effluent as described above, wherein the diluent, monomer, and comonomer have relative boiling points as also described above, the apparatus comprising: a flash means for receiving the effluent and flashing liquid in the effluent to vapor; a first fractionation stage which includes a first fractionation column and which receives vapor from the flash means; a first compressor for compressing at least a portion of the vapor passing from the flash means to the first fractionation means; means for withdrawing comonomer from the first column as a fractionation product; a cooler for receiving and substantially condensing overhead vapor containing diluent and monomer from the first column to thereby yield a substantially condensed overhead stream; an accumulator for receiving the substantially condensed overhead stream and in which liquid and vapor from such stream are allowed to separate; a second fractionation stage which includes a second fractionation column; a second compressor for receiving and compressing vapor from the accumulator for delivery to the second fractionation stage; a pump for receiving and increasing the pressure of liquid from the accumulator for delivery to the second fractionation stage; and means for withdrawing diluent and monomer from the second column as fractionation products.

According to a preferred embodiment hereafter described, the flash means comprises two flash tanks at different pressures. Vapor from the lower pressure flash tank is compressed by the first compressor. Such first compressor may be a reciprocating compressor or a screw compressor. The second compressor is preferably, as discussed above, a centrifugal compressor.

BRIEF DESCRIPTION OF THE DRAWING

The FIGURE is a schematic diagram of a preferred embodiment of the invention.

DETAILED DESCRIPTION OF THE INVENTION

The polymerization reactor effluent, a slurry of polymer solids in a liquid with some constituents or portions thereof in a vapor phase as entrained in the liquid, is produced by a reactor (not shown) in which the monomer and comonomer are reacted in the diluent under suitable polymerization conditions. The diluent is maintained in a liquid phase during the polymerization reaction, and the polymer solids produced are not soluble in the diluent. A suitable catalyst, such as a chromium oxide-containing catalyst, can be used in the polymerization reaction.

According to broad aspects of the invention, the invention is applicable to any monomer, comonomer, and diluent having relative boiling points previously described. That is, the boiling point of the comonomer is higher than the boiling point of the monomer, and the boiling point of the diluent is between the boiling points of the monomer and comonomer. It is understood that such description and the appended claims assume such relative boiling points are at a constant pressure.

Both the monomer and comonomer are preferably olefins. The monomer is most preferably ethylene, and the comonomer is preferably an olefin having 4 to 10 carbon atoms per molecule, such as butene, hexene, octene, or decene, most preferably hexene. Where the monomer is ethylene and the comonomer is hexene, the diluent is preferably a paraffin having 3 to 5 carbon atoms per molecule, such as propane, n-butane, isobutane, n-pentane, or isopentane, most preferably isobutane.

A preferred embodiment will now be described where the monomer is ethylene, the comonomer is hexene, and the diluent is isobutane. In the polymerization reaction of the ethylene and hexene, of the combined weights of ethylene and hexene, the hexene preferably comprises less than 10 weight percent, most preferably about 0.25 to 6 weight percent.

The polymerization reactor effluent contains polymer solids as high as 55 weight percent (as based on the total weight of the effluent). The remainder of the effluent typically includes the following constituents in the indicated weight percentages (based on the total weight of the remainder): about 90 weight percent isobutane; about 2–8 weight percent ethylene; about 1–5 weight percent hexene; and small amounts of heavy hydrocarbons (having 7 or more carbon atoms per molecule), hexane, ethane, hydrogen, nitrogen, and other impurities and by-products.

Now referring to the FIGURE, the effluent enters line 10 at a pressure of about 350 psia and a temperature of about 100° F., and proceeds to flow through line 10 so as to be heated by flashline heater 12 prior to its introduction to flash tank 14. The preferred temperature in flash tank 14 is about 170–190° F. Flash tank 14 is operated at a pressure hereafter referred to as the first flash pressure. The first flash pressure can be within a broad pressure range of about 110–210 psia, but is more preferably about 140–190 psia, and is most preferably about 150–170 psia. In any event, the first flash pressure is preferably about 10 psia higher than what is hereafter referred to as the first fractionation pressure, or that pressure at which the first fractionation stage operates. The first fractionation stage includes fractionation column 16. A substantial portion of liquid in the effluent is flashed to vapor in flash tank 14, and the small difference between the first flash pressure and the first fractionation pressure induces the flow of such vapor through line 18 to cyclone collector 20 and also the flow of vapor from cyclone collector 20 to column 16 via line 22.

Cyclone collector 20 removes fine polymer solids, hereafter referred to as polymer particles, which are entrained in vapor. The thus removed polymer particles are passed through line 24 to flash tank 30. Valves 26 and 28 along line 24 are operated by a sequencing controller (not shown) to alternately open and close such valves. For example, valve 26 can be opened for a predetermined period of time while valve 28 remains closed, during which time the portion of line 24 between valves 26 and 28 fills with polymer particles. Valve 26 is then closed and valve 28 opened to allow the passage of polymer particles through valve 28 and line 24 to flash tank 30. Such sequence is then repeated similarly.

Polymer solids and residual liquid (that liquid not vaporized in flash tank 14) are passed from flash tank 14 to flash tank 30 in a similar manner by means of line 31 and associated valve 32, surge vessel 34 which is allowed to fill with polymer solids and residual liquid periodically during the sequence, and line 36 and associated valve 38. Valves 32 and 38 are operated by a sequencing controller which is not shown.

Flash tank 30 is operated at a second flash pressure substantially lower than the first flash pressure, preferably about 20–30 psia. The temperature in flash tank 30 is preferably about 155–175° F. If present, a substantial portion of residual liquid is flashed to vapor in flash tank 30.

Polymer solids and any small amounts of liquid not flashed to vapor are passed to a nitrogen purge column (not shown) through line 40 and associated sequencing valves 42 and 44.

Vapor from flash tank 30 is passed through line 46 to cyclone collector 48, in which entrained solid particles are removed and passed to the above-mentioned purge column through line 50 and associated sequencing valves 52 and 54. Vapor from cyclone collector 48 flows through line 56 to cooler 58, and then through line 60 to compressor 62. Compressor 62, preferably a reciprocating or screw compressor, compresses the vapor to approximately the first fractionation pressure. The thus compressed vapor is passed to column 16 via line 64. By cooling and then compressing the vapor, rather than compressing followed by cooling, this reduces the power required for compression.

Although the illustrated embodiment uses only cyclone collectors to remove polymer particles from vapor in passage from the flash tanks to column 16, bag filters and guard filters can also be used if desired.

The first fractionation pressure, the pressure at which column 16 operates, can be in the broad range of about 100–200 psia, but is more preferably about 130–180 psia, and most preferably about 140–160 psia, to minimize total power requirements. Preferred temperature conditions in column 16 include an overhead temperature (temperature at the top of the column) of about 130–160° F. and a bottoms temperature (temperature at the bottom of the column) of about 310–340° F.

Liquid bottoms product, containing heavy hydrocarbons and some hexene, is withdrawn from column 16 through line 66. A first portion of the bottoms product passes through flow control valve 68 and then to flare. A second portion of the bottoms product is passed from line 66 and through line 70 to heater (reboiler) 72, and from there through line 74 back to column 16.

A preferably vaporous sidedraw stream is withdrawn from column 16 through line 76. The sidedraw stream typically contains about 90–95 weight percent hexene and also contains isobutane and hexane. The sidedraw stream is cooled and condensed by cooler 78, and the resulting condensate flows through line 79 and flow control valve 80 to storage for recycling to the reactor (not shown).

Overhead vapor from column 16, containing isobutane, ethylene, ethane, hydrogen, and nitrogen, passes through line 82 to cooler 84. Cooler 84 substantially condenses the overhead vapor. The resulting substantially condensed overhead stream, at a preferred temperature of about 90–110° F., flows through line 86 to overhead accumulator 88 in which liquid and vapor from such stream are allowed to separate. The contents of accumulator 88 are at the first fractionation pressure and at the aforementioned temperature of about 90–110° F.

Vapor from accumulator 88, containing ethylene and isobutane and also containing ethane, hydrogen, and nitrogen, is passed through line 90 to compressor 92. Compressor 92 is preferably a single stage centrifugal compressor such as, for example, the Sundyne Model LMC-311P compressor. Compressor 92 compresses the vapor to approximately a second fractionation pressure, preferably about 220–250 psia, at which a second fractionation stage operates. Such fractionation stage includes a fractionation column 94 (having a preferred overhead temperature of about 110–120° F. and a preferred bottoms temperature of about 180–200° F.) and an associated overhead accumulator 96. Vapor as compressed by compressor 92 flows through line 98 to line 100.

Liquid from accumulator 88, containing about 95–98 weight percent isobutane and about 2–5 weight percent ethylene, passes through line 102 to pump 104 (preferably centrifugal) which increases the pressure of the liquid to preferably about 250–280 psia. Liquid is pumped by pump 104 through line 106, and a first portion (preferably about ⅓ by weight) flows through flow control valve 108 to column 16 as reflux. A significant pressure drop, typically about 100 psia, occurs across valve 108. A second portion (preferably about ⅔ by weight) of the liquid pumped by pump 104 flows from line 106 through line 110 to flow control valve 112, across which the liquid undergoes a pressure drop of typically about 30 psia to approximately the second fractionation pressure. The liquid as reduced in pressure continues to flow through line 110 to line 100.

Liquid as pumped through line 110 is a major portion by weight of the total flow of pumped liquid and compressed vapor flowing through lines 110 and 98, respectively. This major portion is preferably about 75–95%, and most preferably 80–90%. The advantage of this feature has been previously discussed.

Vapor from line 98 and liquid from line 110 flow through line 100 to and through cooler 114, and then through line 116 for delivery to accumulator 96 at approximately the second fractionation pressure. Liquid and vapor separate in accumulator 96. Accumulator 96 has a vent column condenser of which the upper portion is cooled by a propylene refrigerant to achieve an overhead temperature of about −25 to −10° F. At this temperature most of the isobutane vapor is condensed, while some ethylene, hydrogen, nitrogen, and ethane, as well as a small amount of isobutane, are vented through line 118 and flow control valve 121. The thus vented vapor can go to flare or to an ethylene plant.

Liquid from accumulator 96 flows through line 120 to pump 122, and pump 122 pumps the liquid through line 124 and flow control valve 126 to column 94 at approximately the second fractionation pressure. Overhead vapor from column 94, containing ethylene and isobutane, is passed through line 128 to line 100. At least a portion of such overhead vapor is condensed by cooler 114 and then returned by pump 122 to column 94 as reflux.

A sidedraw stream of liquid, containing about 95–99 weight percent isobutane and about 1–4 weight percent ethylene, is withdrawn from column 94 through line 130. The sidedraw stream flows to and through a cooler 132 and then through line 134 and flow control valve 136 before going to storage for recycling to the reactor (not shown).

Liquid bottoms product, comprising substantially pure olefin-free isobutane, is withdrawn from column 94 through line 136. A first portion continues to flow through line 136, to and through cooler 138, and then through line 140 and flow control valve 142 to storage for recycling to the reactor (not shown). A second portion passes from line 136 to heater 144 (reboiler) via line 146, and from there through line 148 back to column 94.

In the above description, very small pressure drops across coolers and very slight nonuniformities in pressure in the fractionation columns were not considered for simplicity of description.

An example will now be described to further illustrate the invention.

In substantial accordance with the preferred embodiment described above with reference to the FIGURE, a heat and material balance computer simulation was carried out using Aspen Plus™ computer software, available from Aspen Technology, Inc. of Cambridge, Mass. The first flash pressure is about 10 psia above the first fractionation pressure, which is varied from 110 psia to 190 psia. The second flash pressure is fixed at 22 psia. The total vapor flow into fractionation column 16 is 75,030 1 b/hr. The second fractionation pressure is fixed at 232.4 psia. In addition, several assumptions are made in the simulation: compressors 62 and 92 operate at 72% polytropic efficiency; pump 104 operates at 65% efficiency; and a by-pass or inefficiency exists in the flash process by which higher pressure vapor escapes to lower pressure streams and this by-pass rate is proportional to the square root of the pressure difference.

Results of the simulation are presented in the following Example Table. As the first fractionation pressure increases, the total work decreases to a minimum at 145 psia, and then gradually increases through the highest pressure of 190 psia. Total work is defined as the sum of the individual requirements of compressor 62, compressor 92, and pump 104 in reaching the second fractionation pressure. Vapor flow through line 98 and liquid flow through line 110 are also indicated in the Table, as well as the liquid flow/total flow. This percentage increases from slightly above 50% at the lowest pressure of 110 psia to above 98% at the highest pressure of 190 psia. The minimum total work is at about 85%.

Example Table

| 1st Frac. Pressure (psia) | Vapor Flow Line 98 (lb/hr) | Liq. Flow Line 110 (lb/hr) | Liq. Flow/ Total Flow (%) | Total Work (HP) |
|---|---|---|---|---|
| 110 | 32857 | 37885 | 53.6 | 556.3 |
| 115 | 27116 | 43626 | 61.7 | 494.2 |
| 120 | 22790 | 47952 | 67.8 | 448.8 |
| 125 | 19390 | 51350 | 72.6 | 414.3 |
| 130 | 16629 | 54111 | 76.5 | 387.4 |
| 135 | 14326 | 56413 | 79.7 | 366.0 |
| 140 | 12364 | 58375 | 82.5 | 348.8 |
| 145 | 10661 | 60077 | 84.9 | 335.8 |
| 150 | 9162 | 61575 | 87.0 | 337.1 |
| 155 | 7827 | 62910 | 88.9 | 341.2 |
| 160 | 6625 | 64111 | 90.6 | 347.7 |
| 165 | 5536 | 65200 | 92.2 | 356.2 |
| 170 | 4543 | 66191 | 93.6 | 366.7 |
| 175 | 3637 | 67097 | 94.9 | 378.9 |
| 180 | 2811 | 67922 | 96.0 | 392.7 |
| 185 | 2063 | 68670 | 97.1 | 408.0 |
| 190 | 1393 | 69339 | 98.0 | 424.8 |

Duties (not in Table) for heater 72 and cooler 84 increase as the first fractionation pressure increases. The heater duty increases from about 1,650,000 to about 2,700,00 BTU/hr, and the cooler duty increases from about 9,500,000 to about 14,400,000 BTU/hr.

Obviously, many modifications and variations of the present invention are possible in light of the above teachings. For example, instead of using two flash tanks, only a single flash tank could be employed. In such an embodiment, the preferred first fractionation pressure would be about 110–140 psia to minimize total power requirements. It is, therefore, to be understood that within the scope of the appended claims, the invention may be practiced otherwise than as specifically described.

That which is claimed is:

1. A process for recovering diluent, unreacted monomer, and unreacted comonomer from a polymerization reactor effluent comprising a slurry of polymer solids in a liquid as produced by the polymerization reaction of the monomer and comonomer in the diluent, wherein the comonomer has a boiling point higher than the boiling point of the monomer and the diluent has a boiling point between the boiling points of the monomer and comonomer, the process comprising:

passing the effluent to a flash means for flashing liquid in the effluent to a vapor;

providing a first fractionation stage including a first fractionation column and operating at a first fractionation pressure;

passing vapor from the flash means to the first fractionation stage;

withdrawing comonomer from the first column as a fractionation product;

passing overhead vapor containing diluent and monomer from the first column to a cooler which substantially condenses the overhead vapor to thereby yield a substantially condensed overhead stream;

passing the substantially condensed overhead stream to an accumulator in which liquid and vapor from such stream are allowed to separate;

providing a second fractionation stage including a second fractionation column and operating at a second fractionation pressure higher than the first fractionation pressure;

passing vapor from the accumulator to a compressor to compress such vapor for delivery to the second fractionation stage at approximately the second fractionation pressure;

passing liquid from the accumulator to a pump so as to increase the pressure of such liquid for delivery to the second fractionation stage at approximately the second fractionation pressure, wherein the liquid as pumped to the second fractionation stage is a major portion by weight of the total flow of pumped liquid and compressed vapor to the second fractionation stage; and withdrawing diluent and monomer from the second fractionation column as fractionation products.

2. A process as recited in claim 1 wherein said major portion is about 75–95%.

3. A process as recited in claim 2 wherein said major portion is about 80–90%.

4. A process as recited in claim 1 wherein the compressor is a centrifugal compressor for centrifugally compressing vapor from the accumulator.

5. A process as recited in claim 1 wherein the flash means comprises: a first flash tank operating at a first flash pressure and receiving the effluent to produce a vapor for passing to the first fractionation stage; and a second flash tank operating at a second flash pressure lower than the first flash pressure and receiving from the first flash tank polymer solids and residual liquid, residual liquid being flashed to vapor which is compressed before being passed to the first fractionation stage.

6. A process as recited in claim 5 wherein the first flash pressure is about 10 psia above the first fractionation pressure, and the second flash pressure is about 20–30 psia.

7. A process as recited in claim 6 wherein the monomer is an olefin and the comonomer is an olefin.

8. A process as recited in claim 7 wherein the monomer is ethylene and the comonomer is an olefin having 4 to 10 carbon atoms per molecule.

9. A process as recited in claim 8 wherein the comonomer is hexene.

10. A process as recited in claim 9 wherein the diluent is a paraffin having 3 to 5 carbon atoms per molecule.

11. A process as recited in claim 10 wherein the diluent is isobutane.

12. A process as recited in claim 11 wherein the first fractionation pressure is about 100–200 psia.

13. A process as recited in claim 12 wherein the first fractionation pressure is about 130–180 psia.

14. A process as recited in claim 13 wherein the first fractionation pressure is about 140–160 psia.

15. A process as recited in claim 14 wherein the overhead temperature of the first column is about 130–160° F.

16. A process as recited in claim 15 wherein the temperature of the substantially condensed overhead stream and the liquid and vapor in the accumulator is about 90–110° F.

17. A process as recited in claim 16 wherein the second fractionation pressure is about 220–250 psia.

18. An apparatus for recovering diluent, unreacted monomer, and unreacted comonomer from a polymerization reactor effluent comprising a slurry of polymer solids in a liquid as produced by the polymerization reaction of the monomer and comonomer in the diluent, wherein the comonomer has a boiling point higher than the boiling point of the monomer and the diluent has a boiling point between the boiling points of the monomer and comonomer, the apparatus comprising:

a flash means for receiving the effluent and flashing liquid in the effluent to vapor;

a first fractionation stage which includes a first fractionation column and which receives vapor from the flash means;

a first compressor for compressing at least a portion of the vapor passing from the flash means to the first fractionation means;

means for withdrawing comonomer from the first column as a fractionation product;

a cooler for receiving and substantially condensing overhead vapor containing diluent and monomer from the first column to thereby yield a substantially condensed overhead stream;

an accumulator for receiving the substantially condensed overhead stream and in which liquid and vapor from such stream are allowed to separate;

a second fractionation stage which includes a second fractionation column;

a second compressor for receiving and compressing vapor from the accumulator for delivery to the second fractionation stage;

a pump for receiving and increasing the pressure of liquid from the accumulator for delivery to the second fractionation stage;

means for withdrawing diluent and monomer from the second column as fractionation products.

19. An apparatus as recited in claim 18 wherein the second compressor is a centrifugal compressor.

20. An apparatus as recited in claim 19 wherein the second compressor is a single stage centrifugal compressor.

21. An apparatus as recited in claim 19 wherein the flash means comprises a first flash tank for receiving effluent and producing vapor for passage to the first fractionation stage, and also a second flash tank for receiving polymer solids and residual liquid from the first flash tank such that residual liquid is flashed to vapor and passed through the first compressor to the first fractionation stage.

22. An apparatus as recited in claim 21 wherein the first compressor is a reciprocating compressor or a screw compressor.

\* \* \* \* \*